(No Model.)
J. S. GRIFFITH.
HEATING AND BLOW-OFF APPARATUS FOR STEAM BOILERS.
No. 244,450. Patented July 19, 1881.
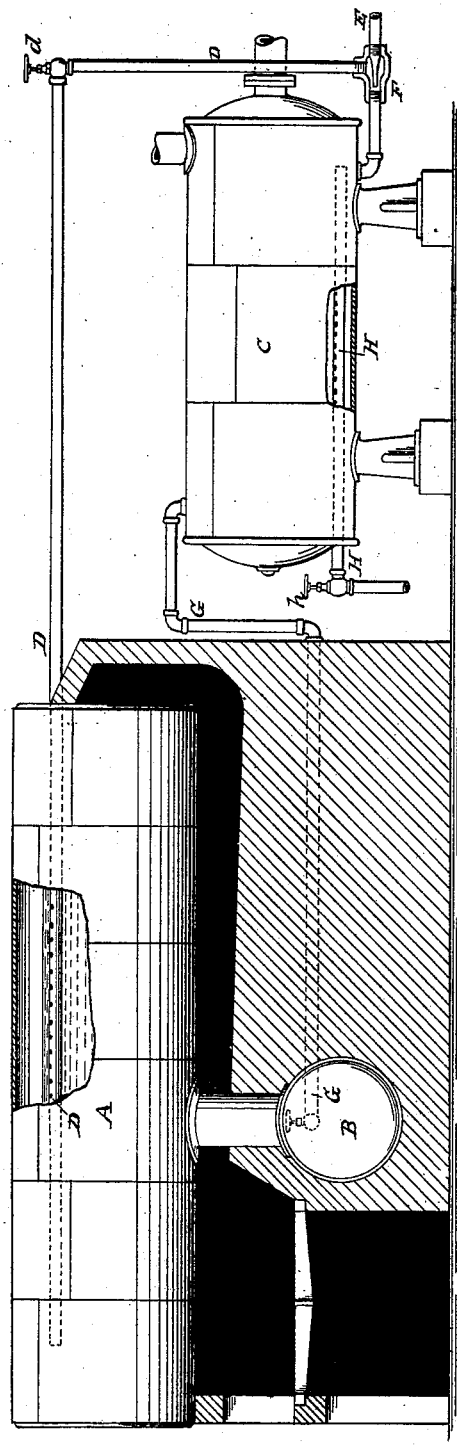
ATTEST:
INVENTOR:
James S. Griffith
per,
Robt Burns
attorney.

UNITED STATES PATENT OFFICE.

JAMES S. GRIFFITH, OF ST. LOUIS, MISSOURI, ASSIGNOR OF ONE-HALF TO FREDERICK LOEHR, OF SAME PLACE.

HEATING AND BLOW-OFF APPARATUS FOR STEAM-BOILERS.

SPECIFICATION forming part of Letters Patent No. 244,450, dated July 19, 1881.

Application filed April 23, 1881. (No model.)

To all whom it may concern:

Be it known that I, JAMES S. GRIFFITH, a citizen of the United States, residing at the city of St. Louis, in the State of Missouri, have invented a certain new and useful Improvement in Combined Feed-Water-Heating and Surface-Blow-Off Apparatus for Steam-Boilers, of which the following is a specification.

This invention has for its objects, first, the thorough removal of the floating surface-sediment from the water in a steam-boiler; second, the precipitation in a more effective manner than has heretofore been accomplished of the scale-forming matter, &c., within the heater before it enters the boiler. I attain these objects by the mechanism illustrated in the accompanying drawing, which represents in side view and part in section my improved construction.

Referring to the drawing, A represents a horizontal boiler provided with a mud-drum, B, as usual.

C represents a closed or pressure feed-water heater or tank of any suitable form or construction, the only necessary requisite of which is that the water in the same shall be under boiler-pressure.

D is a perforated blow-off or skimmer pipe arranged longitudinally in the boiler near the water-line. This pipe extends to and is connected to the feed-water delivery-pipe E of the heater by means of an injector, F, the construction being such that the feed-water passing along the pipe E will cause a circulation in the pipe D, and carry the surface-water of the boiler, with its floating impurities, into the feed-water heater, where it will be in a very favorable condition to deposit the same. The water brought from the boiler, as above stated, accomplishes another very important result—namely, it will (owing to its high temperature) heat the feed-water in the heater sufficiently hot, so as to precipitate the scale-forming substances in the water that require a high temperature to precipitate them from solution. It has been found by practical experiment that in order to precipitate such mineral substances as sulphate of lime, carbonate of lime, &c., from solution in water will require a temperature approximating 260°, and as by my construction I am enabled to heat the feed-water to this temperature I am enabled to effect the thorough removal of such mineral substances from the feed-water before it enters the boiler, and by this means greatly prolong the life of the boiler and at the same time add to its effectiveness. The action of the skimmer or blow-off pipe D is regulated and controlled by a stop-valve, d, as shown.

G is the discharge or outlet pipe from the feed-water heater, which may be connected to the mud-drum, as shown, or in case where the mud-drum is omitted the attachment may be made direct to the bottom of the boiler.

H is a perforated pipe arranged horizontally within the heater, near its bottom, and is provided with a stop-valve, h, as shown. The purpose of this pipe is to take up and remove the sediment, &c., that settles in the bottom of the heater, its action being regulated and adjusted by the stop-valve h.

I am aware that it is not new to arrange a perforated pipe in a horizontal position within a steam-boiler for the purpose of removing the surface-sediment from the same, and I do not therefore claim such construction, broadly, but

Having thus fully described my invention, what I claim as new, and desire to secure by Letters Patent, is—

1. The combination of the surface blow-off pipe D, feed-water pipe E, injector F, and feed-water heater C, the parts being so arranged that the sediment from the boiler will be removed and deposited in the heater, in the manner and for the purpose substantially as herein described.

2. The combination of the surface blow-off pipe D, feed-water pipe E, injector F, feed-water heater C, and sediment blow-off pipe H, all arranged as herein described, and for the purpose set forth.

Signed at St. Louis, State of Missouri, this 19th day of April, 1881.

JAMES S. GRIFFITH.

In presence of—
ROBT. BURNS,
P. M. CONNELLY.